United States Patent [19]
Wicks, III et al.

[11] Patent Number: 5,094,103
[45] Date of Patent: Mar. 10, 1992

[54] STEAM QUALITY AND FLOW RATE MEASUREMENT

[75] Inventors: Moye Wicks, III; Boyd B. Moore, both of Houston, Tex.

[73] Assignee: Shell Oil Company, Houston, Tex.

[21] Appl. No.: 516,589

[22] Filed: Apr. 30, 1990

[51] Int. Cl.$^5$ ............................................. E21B 47/00
[52] U.S. Cl. ..................................... 73/155; 73/29.01; 166/303; 166/250
[58] Field of Search ............... 73/155, 29.01; 166/250, 166/303

[56] References Cited

U.S. PATENT DOCUMENTS

| | | | |
|---|---|---|---|
| 3,934,469 | 1/1976 | Howard et al. | 73/155 |
| 4,581,926 | 4/1986 | Moore et al. | 73/155 |
| 4,715,440 | 12/1987 | Boxell et al. | 166/250 |
| 4,736,627 | 4/1988 | Wicks III et al. | 73/155 |

Primary Examiner—Hezron E. Williams
Assistant Examiner—Craig Miller

[57] ABSTRACT

A method and apparatus for measuring both the quality and flow rate of steam injected into a hydrocarbon formation in a thermal recovery process. The method measures both the quantity of water and the flow rate of the steam. Both measurements can be made at any location in the borehole to determine the quality and quantity of steam injected into a particular formation. The apparatus utilizes a propeller motor/generator combination to determine the vapor flow rate; the drag produced by a network of bristles extending across the borehole determines the vapor flow rate and the quantity of liquid present.

17 Claims, 8 Drawing Sheets

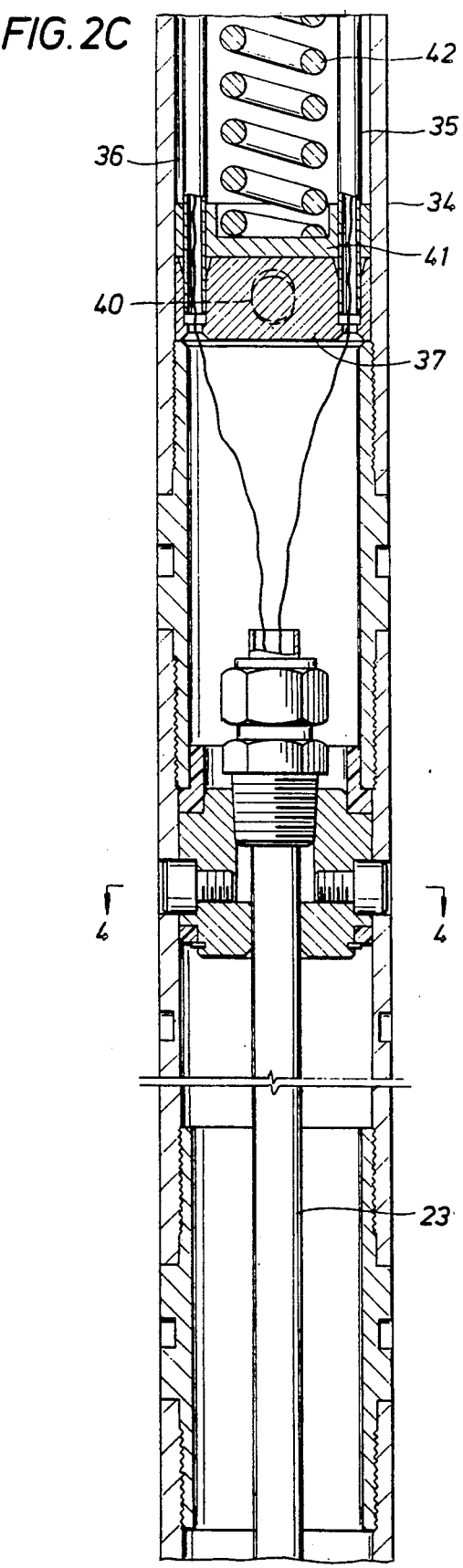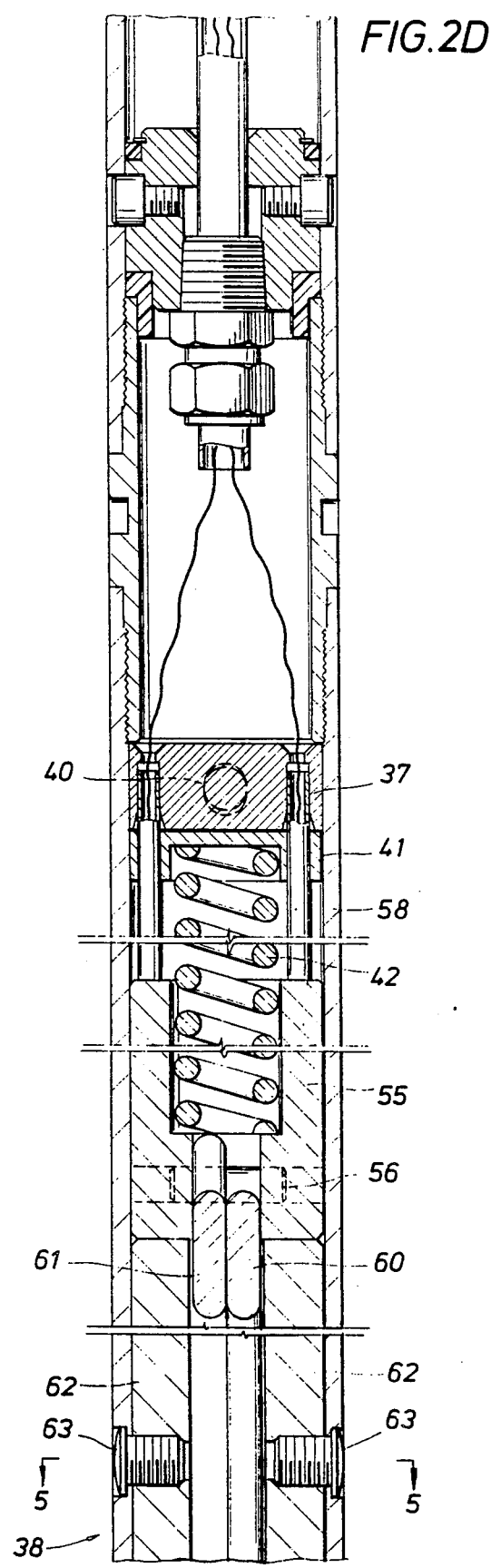

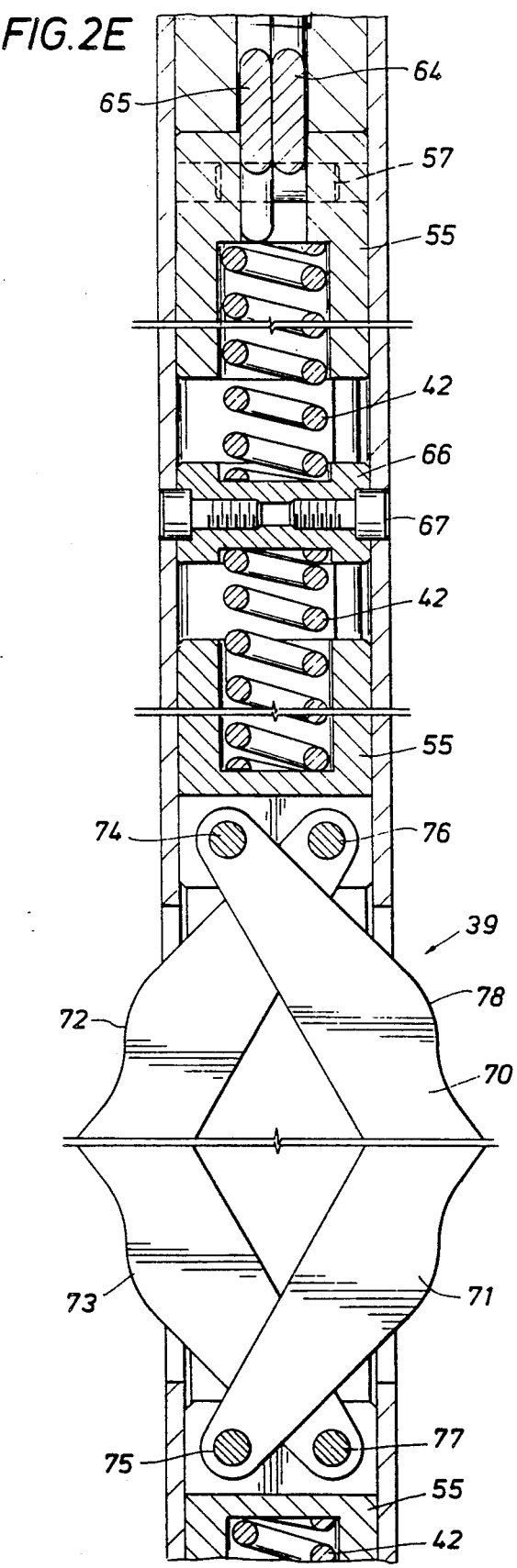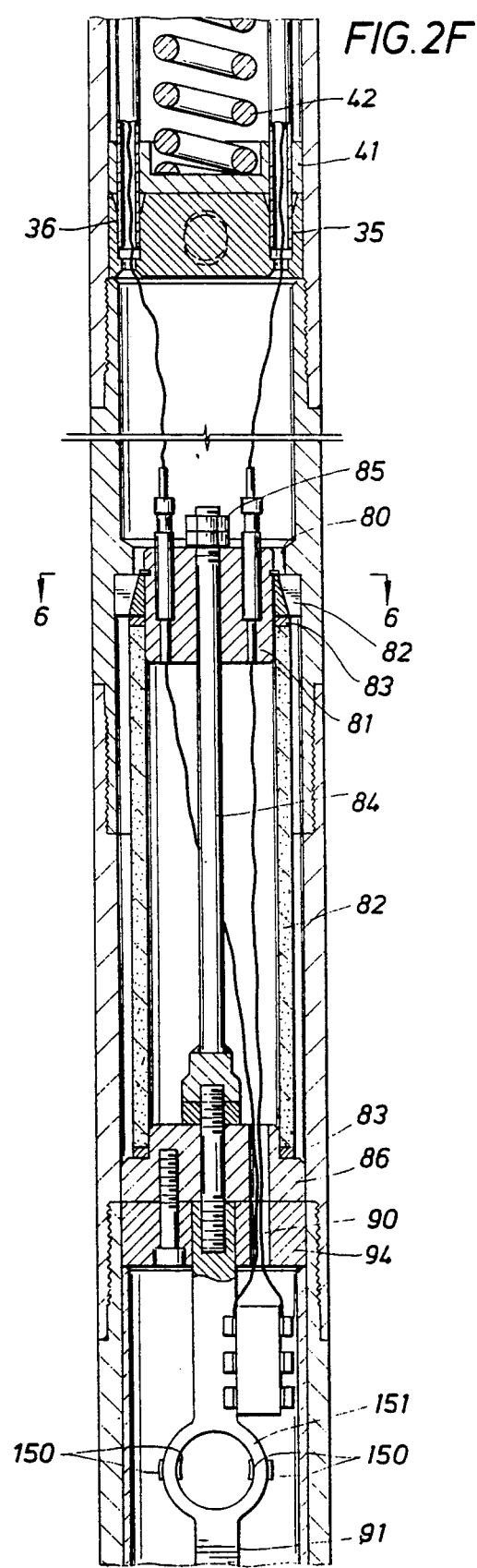

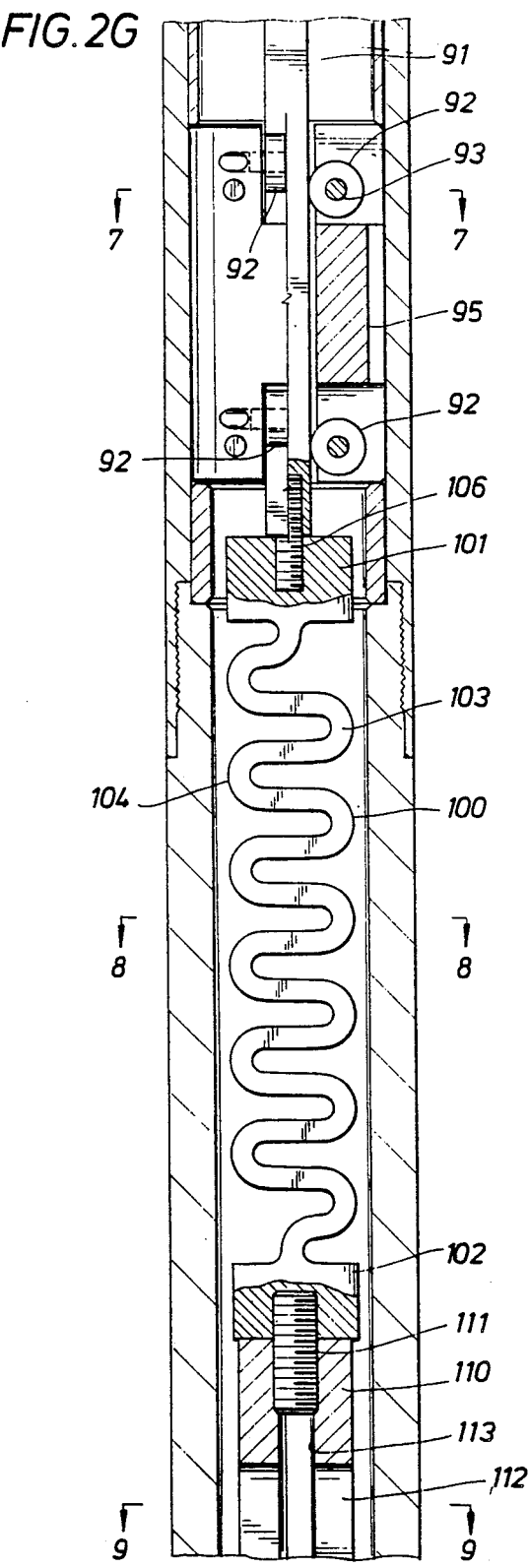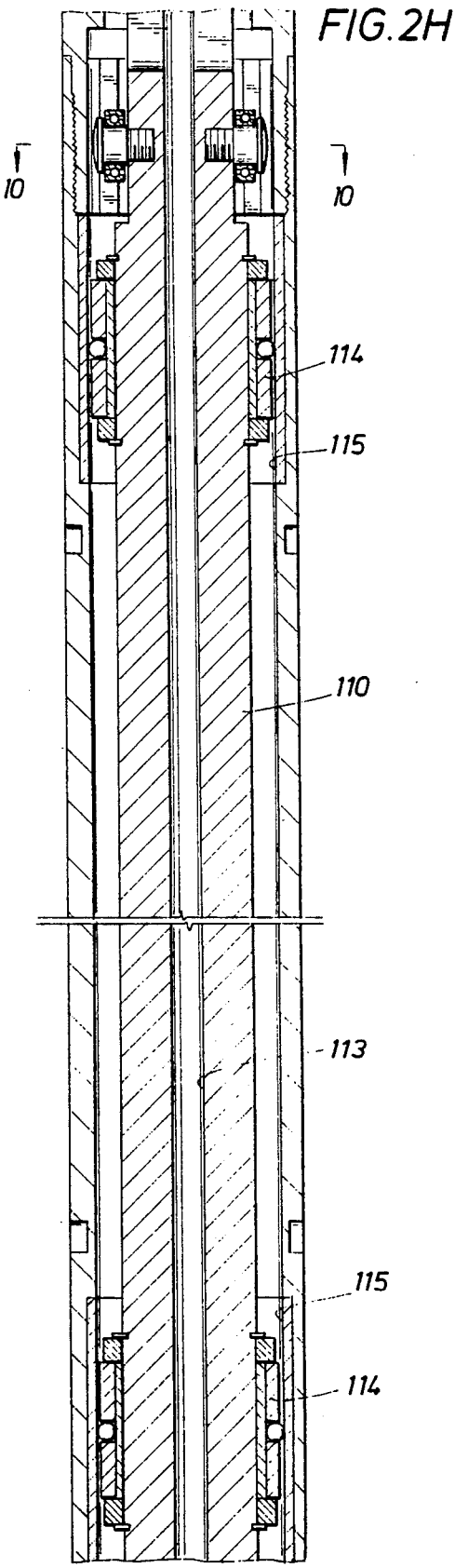

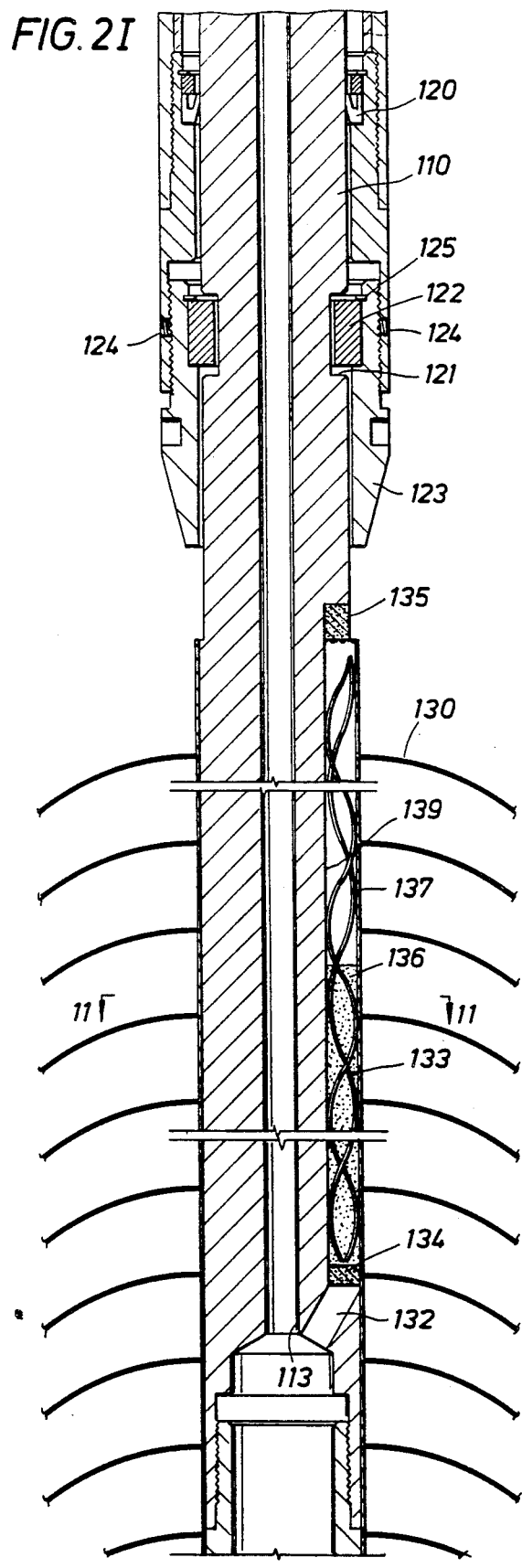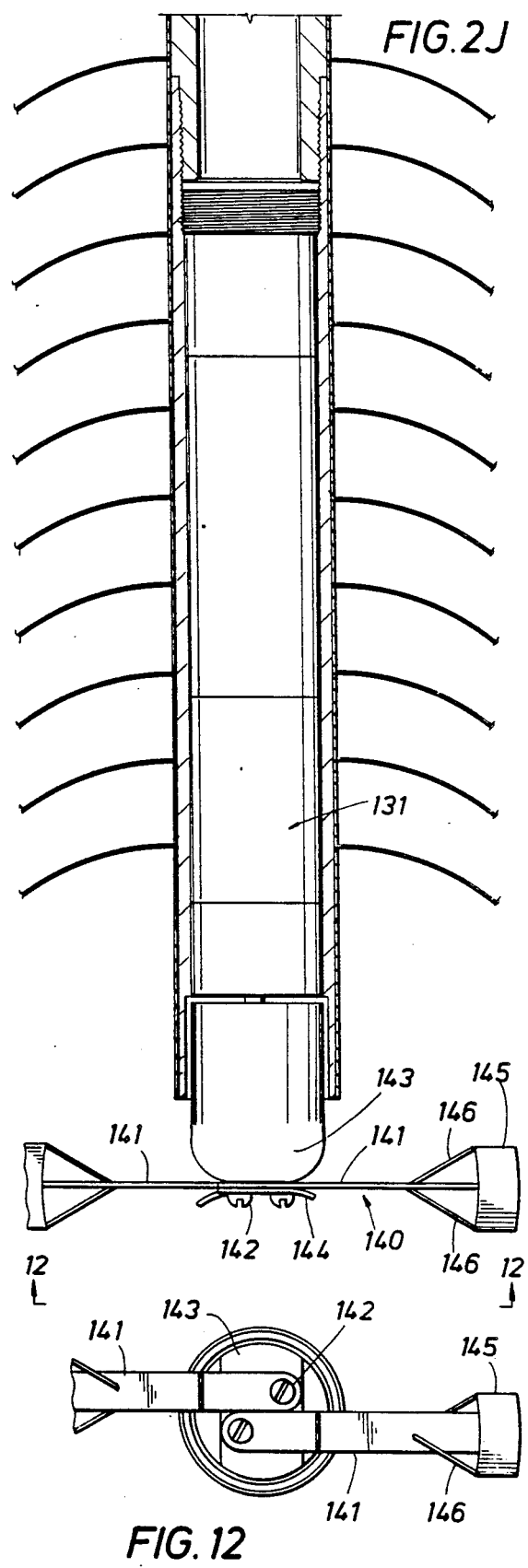

STEAM QUALITY AND FLOW RATE MEASUREMENT

BACKGROUND OF THE INVENTION

The present invention relates to the production of liquid hydrocarbons and particularly to the production of heavy liquid hydrocarbons using various thermal methods. In particular, the invention relates to the production of liquid hydrocarbons utilizing steam to heat the formation containing the hydrocarbons. This method is especially adaptable to the recovery of heavy crude deposits.

The enhanced recovery of heavy crude deposits using various steam methods has become particularly attractive in recent years due to the increase in the price of crude oil. While the recovery of heavy crude deposits is economically viable, it is still a very expensive operation compared to other methods of recovering crude. The cost of generating the steam required for recovering the crude oil deposits accounts for a considerable percentage of the actual crude recovered. The process can require as much as one-third of the total crude oil recovered to produce the steam necessary for the recovery process. Thus, it is readily appreciated that any technique that permits the operator to utilize the steam more efficiently will produce large economic benefits.

In U.S. Pat. No. 4,581,926 there is disclosed a method for measuring both the quality and the quantity of steam being injected into a selected formation. Knowing the quality and quantity of the steam being injected into a selected formation the operator can adjust the quantity injected to provide the most efficient recovery of crude oil. The measurement of the quantity of steam injected into the various formations can be used to develop an injection profile for the well. The injection profile will allow the operator to quickly detect any problems with the well such as a breakthrough between the injection well and the producing well.

The apparatus disclosed in patent '926 utilizes a turbine wheel mounted on the shaft of a direct current permanent magnet motor/generator. The motor/generator is coupled to the surface by a suitable cable means so that current may be either supplied to the motor to drive it or to measure the current produced when it is operated as a generator. Utilizing these measurements, one can compute the torque versus speed curve produced by the motor generator. Using this data and the procedure described in the patent, one can determine the quality and quantity of steam being injected.

In U.S. Pat. No. 4,736,627 there is disclosed an improvement on the above described patent. In particular, this patent describes an apparatus utilizing a series of wire bristles to temporarily separate the liquid from the vapor in the steam. The bristles have a length greater than the radius of the borehole and are curved either in an upward or downward direction as the measuring tool carrying the bristles is lowered or raised in the borehole. The tangential contact between the bristles and the borehole wall tends to capture the liquid film that flows along the wall of the borehole and direct it inwardly toward the center of the measuring tool.

SUMMARY OF THE INVENTION

The present invention is an improvement of the basic system disclosed in the two aforementioned patents. The improvement resides in an apparatus and method for determining the quantity of water contained in the two phase steam flow that does not require the separation of the water from the two phase flow as called for in patents '926 and '627. The elimination of the need to separate the liquid from the two phase flow greatly simplifies the apparatus and the instrumentation necessary for measuring the quantity of liquid. In particular, the motor/generator turbine wheel combination is now required to only measure the vapor flow and not the quantity of water.

The apparatus comprises an elongated housing which may be lowered into the wellbore and positioned adjacent the selected formation. The elongated housing is comprised of two separate sections which are resiliently connected so that the lower section may move axially relative to the upper section along the elongated axis of the housing. The upper housing is provided with improved means for centering the housing in the exact center of the wellbore so that the bristle arrangement described in the '627 patent can uniformly contact the borehole wall. The motor/generator turbine combination described in the above patents is disposed at the bottom or lower end of the lower section of the housing. This lower section of the housing also carries the bristle brush arrangement described in the '627 patent.

The resilient means used for connecting the upper and lower sections of the housing preferably comprises a combination tension-compression spring that resists torsional movement. In particular, the spring is capable of absorbing both compression and tension along the longitudinal axis of the housing while resisting any tendency of the lower section of the housing to rotate with respect to the upper section of the housing. The function of the spring is to limit the amount of force up or down on the tool in case it gets stuck. A suitable tension measuring means is, for example, a strain gauge measuring system disposed on an element attached to the spring to measure the drag of the bristles. The invention utilizes the measured drag force produced by liquid and vapor flow as the bristles are moved along the borehole wall to determine the quantity of liquid present in the two phase system. It has been discovered that the drag force produced by the liquid varies in relation to the amount of liquid present on the borehole wall. Substantially all of the liquid present in a two phase system flowing in an enclosed conduit migrates to the wall of the conduit, the measurement of the drag force produced by bristles stripping this liquid off the wall and by vapor flow through the bristles provides an effective means for determining the quantity of liquid.

The tool is further improved by providing a simplified turbine wheel arrangement that does not require the blades to fold inwardly so that the tool can be withdrawn through a small diameter production tubing. In particular, the blades of the turbine wheel are mounted on thin spring-like arms which can readily bend to allow the measuring tool to be withdrawn from the borehole through small diameter production tubing. It is possible to utilize a turbine wheel of simplified construction since it is no longer necessary for the blades to be folded inwardly into a known configuration to measure the quantity of water separated from the two phase flow as described in patent '627.

Other purposes, distinctions over the art, advantages and features of the invention will be apparent to one skilled in the art upon review of the following.

BRIEF DESCRIPTION OF THE DRAWINGS

The actual construction, operation, and the apparent advantages of the present invention will be better understood by referring to the drawings in which like numerals identify like parts and in which:

FIGS. 2A-2J are a series of elevation views of the logging tool shown in FIG. 1 with portions shown in cross-section, and other sections omitted to shorten the overall length of the tool. The drawings may be connected end-to-end to provide a complete longitudinal view of the tool.

FIGS. 3-12 are a series of cross-sections of the tool shown in FIGS. 2A-2J.

DESCRIPTION OF THE PREFERRED EMBODIMENTS

Figure 1:
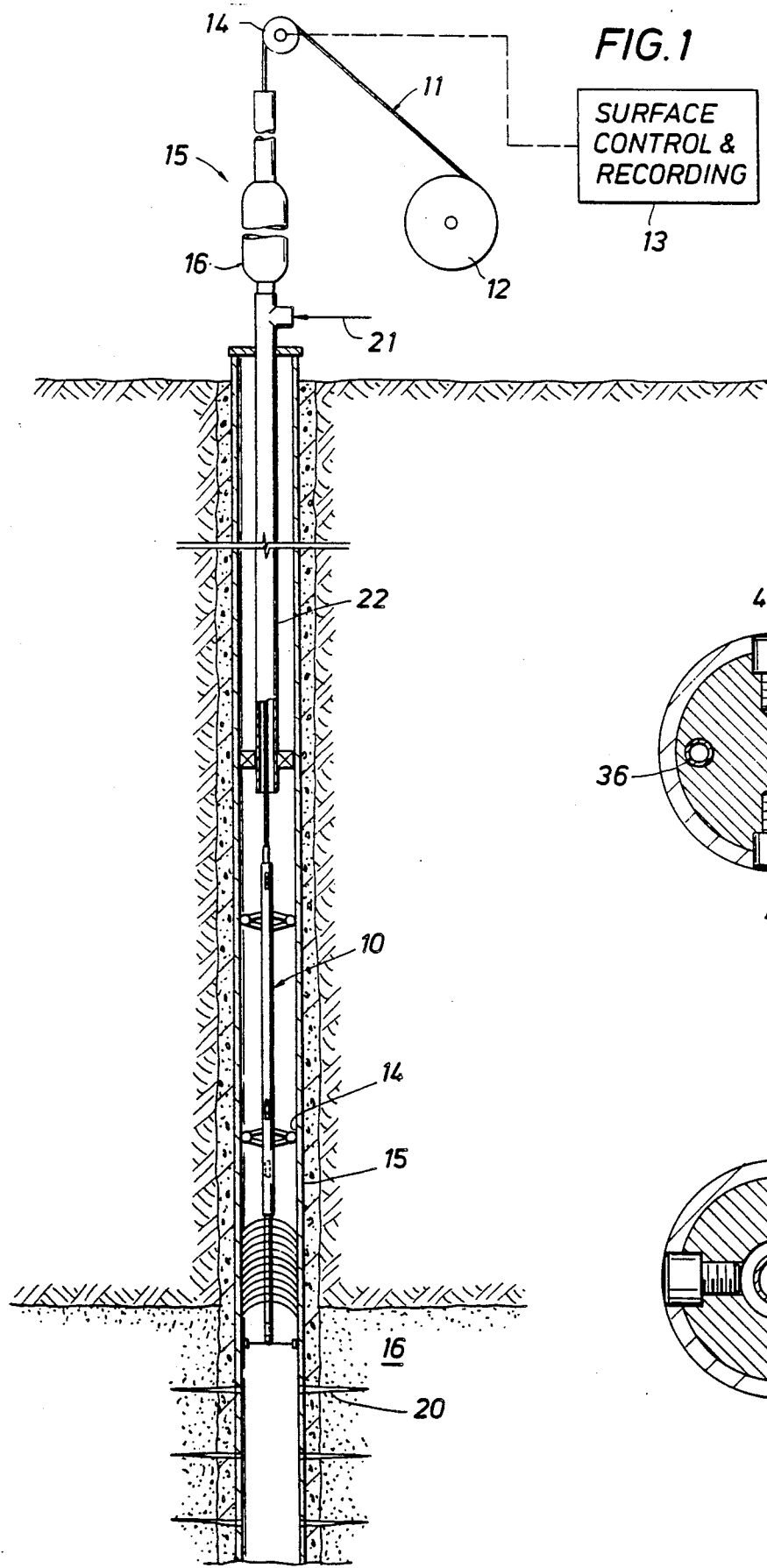
FIG. 1 is an elevation view shown partly in section of the logging tool of the present invention disposed in a wellbore.

Referring to FIG. 1 there is shown the logging tool or downhole measuring device of the present invention disposed in a borehole 15. The borehole is cased by a casing 14 and is provided at its upper portion with a production tubing string 22 which has a significantly smaller internal diameter than the casing. The borehole penetrates a hydrocarbon bearing formation 16 into which the steam is injected through perforations 20 in the well casing. The steam heats the heavy crude contained in the formation so that it may be produced.

The tool is lowered into the borehole and retrieved by means of a cable 11 which contains suitable conductors for supplying power to the tool and transmitting signals from the tool to the surface. In this invention the cable 11 comprises an outer solid tubular member with the electrical conductors being disposed within the tubular member. This combination permits one to inject a purge gas into the downhole tool through the tubular member as described in detail below. The combination of the tubular member and electrical conductors will be referred to as a well logging cable in the present description. The well logging cable is stored on a reel 12 and passes over a measuring sheave 14. The electrical conductors are coupled through a suitable slip ring arrangement on the reel 12 to a surface control and recording instrument 13. Steam is injected into the well from a suitable source (not shown) through the supply line 21 which is connected to the well tubing 22. The tool is inserted into the well through a conventional wellhead lubricator 15 having an enlarged diameter section 16. The lubricator should have sufficient length to accommodate the assembled tool. The enlarged diameter section of the lubricator is used to invert the bristles on the tool as described below.

Referring now to FIG. 2, there is shown an elevation view of the logging tool 10 of FIG. 1. In particular, the individual drawings of FIG. 2 can be connected end-to-end to illustrate the complete tool with some portions of the tool being shown in section and other portions being shown in elevations. In addition, portions of the tool are omitted to shorten the overall length of the drawings. Identical items appearing in more than one of the Figures are indicated by the same number.

The upper section or casing of the tool is shown constructed of numerous tubular sections which are threaded together to form a unitary housing. The lower section of the tool is formed by a support means with a short tubular section at its lower end for carrying the bristle arrangement described in the '627 patent and the motor/generator turbine wheel combination described in the '926 patent. In addition to the tubular section numerous tubular spacing members are positioned inside the tubular sections for fixing the axial position of various components of the tool. Internal flanges for supporting some components are also formed by utilizing tubular members having a reduced diameter and positioning them inside the tubular section. A typical tubular member of reduced diameter which forms an internal flange is shown at 29 which forms an inwardly projecting flange or surface that holds the member 37 in position as described below. Since the construction of a tool housing using threaded tubular sections is within the skill of those skilled in the art, no further description of the housing will be included.

Figure 2A:
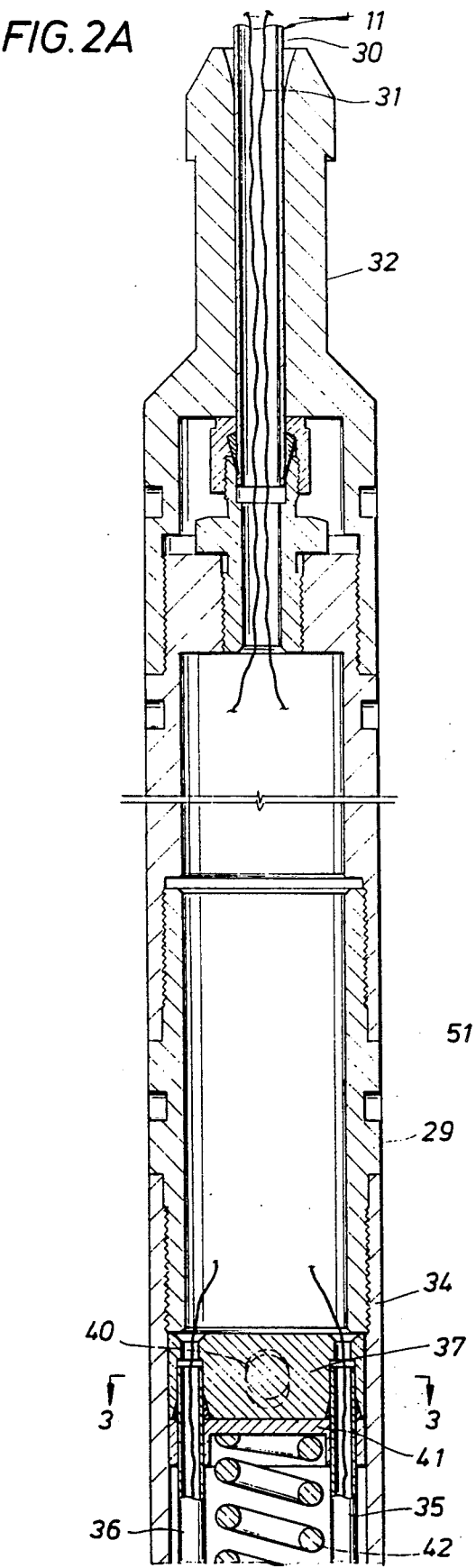

Referring to FIG. 2A, the cable 11 that comprises an outer tubular member 30 having suitable electrical conductors 31 disposed therein is connected to the tool through a suitable fishing neck 32. As is conventional in logging tools the cable is firmly connected to the fishing neck, yet it may be forcibly removed if the tool becomes stuck in the borehole. This permits recovery of the tool by fastening a fishing tool on the fishing neck 32.

Figure 3:
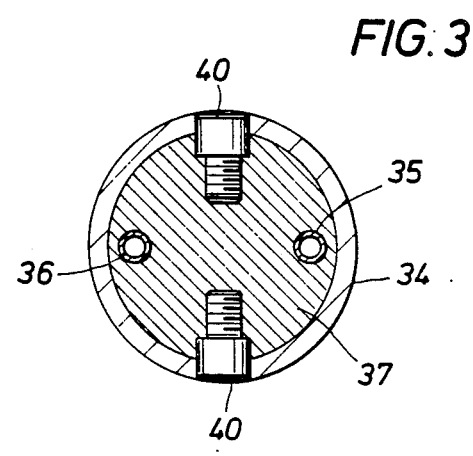
Figure 4:
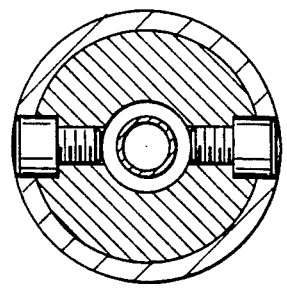
Figure 2B:
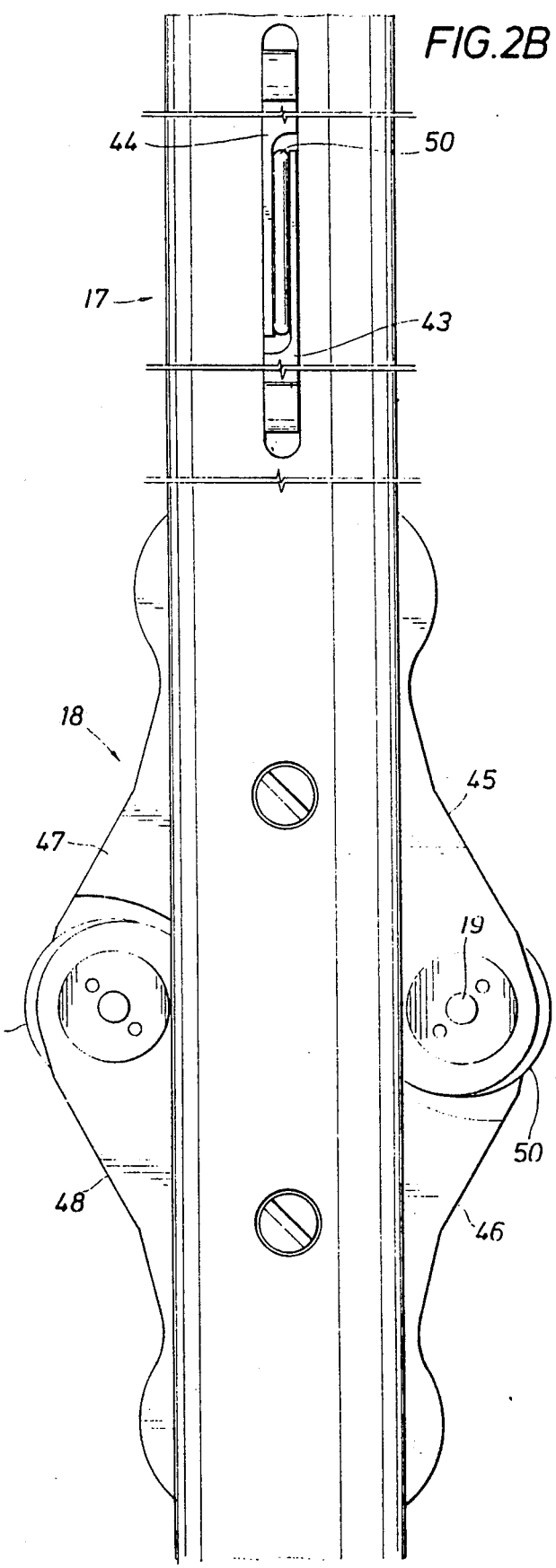

The upper portion of the tool is provided with two centralizing means 17 and 18 that are disposed at right angles to each other to center the tool within the borehole. Each of the centralizing means comprises two sets of arms that are disposed diametrically opposite each other on the tool and biased to move radially outward to engage the borehole wall. In particular, the centralizing means 18 comprises a pair of arms 45 and 46 on one side of the tool and a companion pair of arms 47 and 48 on the opposite side of the tool as shown in FIG. 2B. The arms are forced radially outward by a compression spring 42 whose upper end is retained in a cup member 41 shown in FIG. 2A. The cup member is held in position by solid member 37 which abuts the lower surface of the tubular member 29 and is locked in position by a series of cap screws 40 as shown in the cross section of FIG. 3. Two openings are formed in the member 37 in order that the electrical connectors may be passed through the tool and in addition, providing a passage through which the purge gas may flow to the lower portion of the tool.

The ends of the centralizing arms are pivotally connected together and provided with a wheel-like members 50, 51 as shown in FIG. 2B. It is preferred that the wheels be mounted on suitable anti-friction bearings, for example, roller bearings, to minimize the friction as the tool is lowered or raised in the borehole. The combination of the centralizing means 17 and 18 being disposed at right angles to each other provide a means for accurately centering the logging tool in the borehole. The means used for pivoting the upper ends of the centralizing arms and the action of the compression spring in forcing the arms radially outward will be more readily apparent in FIGS. 2D and 2E and the following description of these Figures below. While the centralizing means are shown herein they are described in detail and claimed in a copending application Ser. No. 428,528 filed Oct. 30, 1989.

Referring to the upper portion of FIG. 2C, there is shown the lower portion of one of the compression springs 42 and retaining means 41 and 37. The compression spring 42 shown in FIG. 2C is used to force the lower set of centralizing arms 46 and 48 radially outward as shown in FIG. 2B. Also shown in FIG. 2C is a tubular member 23 through which the purge gas and electrical connectors may pass through a section of the housing. This portion of the housing may be used for mounting electrical and electronic equipment required to operate the tool and make the necessary measurements.

Figure 5:
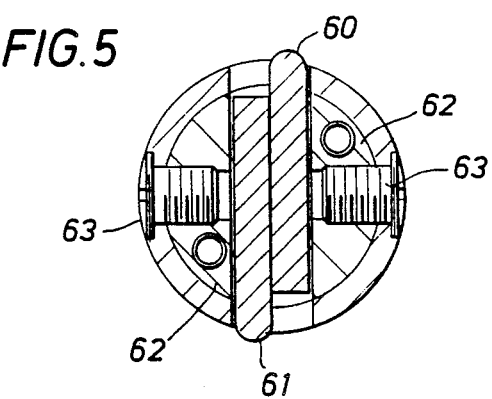

Referring to FIG. 2D there is shown the spring arrangement and pivot arrangement for one centralizing arm 60 of a pair of centralizing arms 60 and 61. In particular, a compression spring 42 is shown whose upper end is retained by the same means as described above (not shown). The lower end of the compression spring is retained in a cup member 55 which is disposed to move axially within the tubular section 58 of the housing. The cup member 55 also carries the pivoting means which comprises a pin 56 for one centralizing arm 60. The other centralizing arm 61 is pivoted on a separate pivot pin which is offset from the pin 56 shown. This arrangement is more readily seen in FIG. 2E and described below. As shown in FIG. 2D the compression spring 42 is completely extended thus forcing the ends of the centralizing arms 60 and 61 into their extreme radial position. The movement of the spring retaining member 55 is limited by the guide means 62 that are retained in an axial position in the tool housing by means of cap screws 63 which pass through openings in the wall of the tubular member and thread into the guide means. As shown in FIG. 5 the guide means are half round members that are positioned in the section 58 of the housing and serve as both stops and guides for the centralizing arms 60 and 61 to prevent their twisting or otherwise being distorted in the borehole.

The companion pair of centralizer arms 64 and 65 for the pair 60-61 are shown at the top of FIG. 2E. Arm 64 of this pair is pivoted on pivot pin 57 while the arm 65 is pivoted on a similar pivot pin (not shown). The arms are biased radially outwardly by the compression spring 42 whose upper end is retained in the spring cup and mount 55 and whose lower end is supported by a bulkhead member 66. Bulkhead member 66 is provided with suitable recesses on its opposite sides for retaining the ends of the springs 42 and is held in position by means of cap screws 67 which pass through the wall of the tubular section 34 and thread into the bulkhead member.

Referring now to the bottom of FIG. 2E there is shown a companion set of centralizer arms 70 and 71 for the pair 60-65 described above. The set of arms 70-71 are pivoted on pivot pins 74 and 75 and the set of arms 72-73 are shown pivoted on pivot pins 76 and 77. In particular, there is shown the arrangement wherein the individual pivot pins are placed off the longitudinal axis of the housing so that the springs 42 always exert a force that tends to force the ends of the centralizing arms radially outward. This ensures that the arms will never be retracted into a position where the pivots for the companion arms, for example 70-71, are in line with the pivot for the ends of the arms as shown at 19 in FIG. 2B.

From the above description of the centralizing arms, the arrangement of offset pivots and the compressions springs 42, it is seen that the arms are constantly biased radially outward. The force produced by the springs is sufficient to maintain the wheel members 50 and 51 in contact with the wall of the borehole. In contrast, only a slight force exerted on the rounded surfaces of the arms, for example surface 78 of the arm 70, will easily force the centralizing arms into a retracted position. This can be appreciated when it is realized that when the arms are extended so that the contact wheels 50 as shown in FIG. 2B are in contact with the wall of the borehole any tendency of the tool to move off center will produce only a slight inward force on the wheel even in case of rather large lateral movements of the contact wheel. In contrast, the force applied to the surface 78 by the wall of a smaller tubular member, for example the production tubing 22, will easily force the centralizing arms inwardly. Similarly, if the tool encounters a restriction as it moves through the well, the arms will move inwardly.

Figure 6:
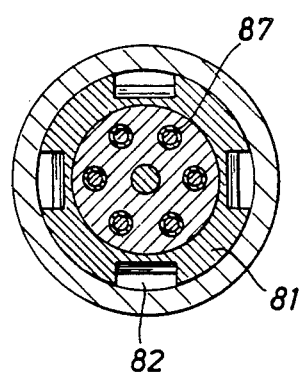

Referring now to the lower portion of FIG. 2F there is shown a filter 82 that is used for filtering the purge gas to remove any foreign material. As explained above, the purge gas is used to maintain a positive pressure differential in the motor/generator set described below to exclude any borehole fluid therefrom. Since the bearings in the motor/generator operate in a non-lubricated state, it is essential that all foreign material be removed from the purge gas. The filter 82 is clamped between two bulkheads 81 and 86 which are secured in the housing of the logging tool. The filter is provided with suitable sealing rings 83 at each end and tie rod 84 is used for firmly clamping the filter between the two bulkheads. In addition, an annular space 80 is provided around the upper end of bulkhead 81 for allowing the purge gas to flow downwardly through slots 82 around the outside of the filter and into the interior thereof. This is particularly shown in the cross section of FIG. 6. Similarly, the electrical leads pass through suitable sealing means 87 disposed in the bulkhead 81 to prevent the purge gas from by-passing the filter. The purge gas passes from the interior of the filter through a suitable passageway 90 in the bulkhead 86 and to the interior of the logging tool.

Figure 7:
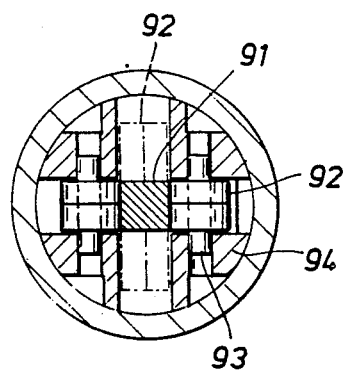

Affixed to the bulkhead 94 is a spring support rod 91 that forms part of the lower section of the tool. The spring support rod has a basically square shape as best shown in the cross section of FIG. 7. As shown in the upper portion of FIG. 2G, a suitable guide means for the support rod 91 is provided by means of a series of guide rollers 92 which are pivoted on shafts 93. The guide rollers are mounted on mounting means 95 which is retained in a fixed position in the tubular housing by means of spacing members.

Figure 8:
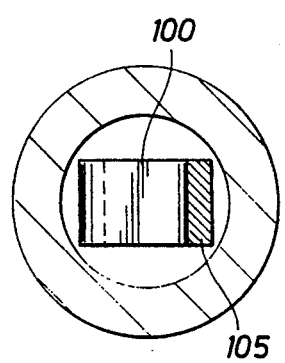
Figure 9:
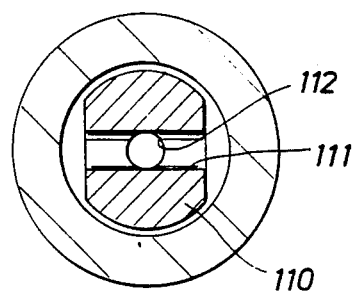
Figure 10:
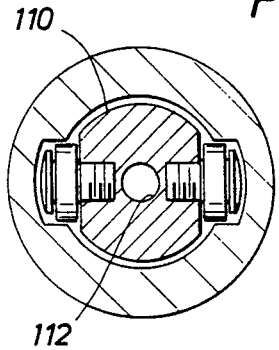

The lower end of the spring support is coupled to a support spring 100 having a high spring rate. The support spring responds to compression and tension loads but has a high resistance to any torsional movement. In particular, the spring has a substantially rectangular cross section 105 as shown in FIG. 8 and is formed by a series of uniform bends or folds 103 and 104. Each end of the spring terminates in an enlarged rectangular section 101 and 102, respectively. The spring is preferably formed from a single metallic member with the ends 101 and 102 being formed integrally with the spring section 100. The upper end of the spring is connected by a stud 106 to the spring support bar 91 while the lower end is connected by a similar stud 111 to the upper end of a bristle support rod 110. The combination of the spring support bar 91, spring 100 and support rod 110 form the lower section of the tool. The support rod 110 is provided with a central bore 111 which communicates with the interior of the tubular housing by means of a slot 112 formed in the upper end of the support rod. These features are shown in the cross section of FIG. 9. The support rod 110 is guided along the interior of the tubular housing by means of ball bearings 114 that ride on hardened inserts 115 placed in the interior wall of the tubular housing. The use of the ball bearing guides ensures that the support rod is maintained in a position aligned with the longitudinal axis of the logging tool while allowing axial movement between the rod and the interior surface of the tubular housing of the tool.

A suitable stress measuring means is disposed on the spring support rod 91, for example, a strain gauge 150 may be mounted on the surface of a special section 151 of the rod 91. The strain gauge will respond to changes in the stress in the spring. The strain gauge 150 will measure the drag produced by the bristle network as described below. The use of the drag force produced by the bristles greatly simplifies the determination of the quantity of liquid in the two phase flow.

The lower end of the support rod 110 projects through the lower end of the upper section of the tubular housing. The opening in the upper housing is provided with a sealing means 120 for limiting the escape of purge gas from the interior of the logging tool. In addition, the lower end of the upper section is provided with a means for limiting the axial movement of the support rod 110 in relation to the upper section of the housing of the logging tool. In particular, the limiting means comprises a two piece ring member 122 which is secured to the upper section of the tubular housing by means of a snap ring 125 with the lower surface of the ring bearing against a shoulder formed on the section 123 of the housing. An annular groove 121 is formed on the outer surface of the support bar 110 with the length of the groove being slightly larger than the width of the ring 122. The member 123 is threaded into the lower end of the upper section to permit the position of the ring 122 to be adjusted axially with respect to the location of the groove 121. This adjustment allows a fixed travel in both directions and limits the load on the strain gauge assembly to approximately 200 lbs to prevent permanent distortion of the strain gauge. After the ring is properly adjusted the member 123 is locked in position by suitable set screws 124.

Figure 11:
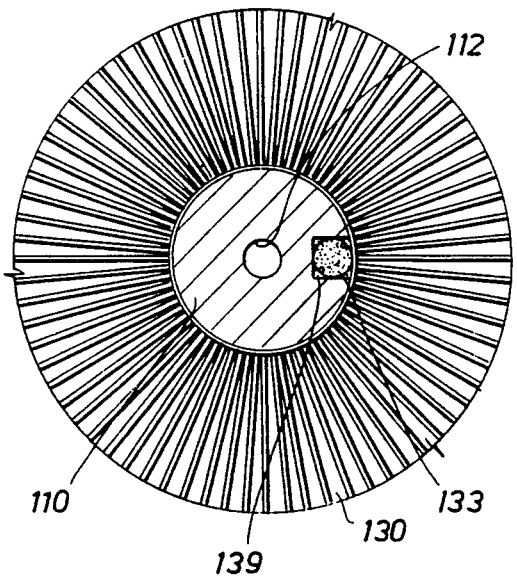

A bristle brush assembly 130, similar to that described in patent '627, is mounted on the lower end of the bristle support bar 110. In addition, the bristle network may take a form similar to that shown in the cross section of FIG. 11 wherein the individual bristles are formed from a flat piece of spring material with the material being formed into a circular pattern as shown in FIG. 11. This method of forming a bristle assembly is more particularly described and claimed in a copending application, Ser. No. 428,527 filed Oct. 30, 1989.

The tool is inserted into the well through the wellhead lubricator 15 shown in FIG. 1. As the tool is lowered into the lubricator the bristles will be bent upwardly. The bristles will remain in this configuration and the tool can be lowered through the production tubing 22. The small diameter of the lubricator and production tubing will not allow the bristle to invert into a downward configuration as shown in FIG. 1. In order to invert the bristles the tool must be in the casing 14 or withdrawn until the bristle network is in the enlarged section 16 of the lubricator. In cases where the tool is being withdrawn from the well and it is desired to re-enter the well, the bristles can be inverted in the enlarged section 16. This eliminates the need to withdraw the tool from the well and thus saves the time required to depressurize and repressurize the lubricator.

The motor/generator 131 is mounted in a recess formed in the end of the bristle support bar and is provided with a turbine wheel or propeller arrangement 140 at its lower end. The purge gas which flows through the central bore 113 of the bristle support bar is vented from the support bar through a port 132. Port 132 communicates with a pressure relief mechanism 133 through a filter element 134. The pressure relief mechanism comprises a fluidized bed 136 disposed in a recess 138 formed in the outer surface of the support bar as shown in FIG. 11. The upper end of the recess is sealed by means of a suitable filter 135. The fluidized bed may contain suitable particles, for example tungsten carbide particles, and is provided with a spiral wire arrangement 137. In particular, the wire arrangement 137 is formed from opposite wound spirals of wire and serves to break up the solid slugs of particles which tend to flow through the fluidized bed and destroy the fluidization of the bed. By breaking up the slug flow it has been discovered that the fluidized bed will maintain a back pressure of 1.0 pounds per square inch on the purge gas and provide a positive seal for the motor generator assembly. The use of a fluidized bed as a means for maintaining a positive pressure in a chamber is more particularly described and claimed in copending application 439,914 filed Nov. 20, 1989, now abandoned.

Referring now to FIG. 2J, the turbine wheel or propeller 140 attached to the lower end of the motor generator set comprises two radially outwardly extending spring-type arm members 141. The members 141 have a large resistance to bending in a circumferential direction as they are rotated but are easily deformed in an axial direction which permits them to fold and be withdrawn through the small diameter production tubing 22 shown in FIG. 1. Thus, the arms will be fully extended when the logging tool is inserted into the enlarged portion of the borehole below the tubing 22 and easily retracted when the tool is removed from the borehole. The arms 141 are secured to the end section 143 of the motor generator by means of small screws 142. In addition, small stop members 144 are provided for ensuring that the ends of the arms are not bent at an acute angle when the tool is withdrawn from the borehole. This ensures that the stresses in the arms 141 will not cause premature breakage of the arms. Suitable vanes 145 are attached to the outer ends of the arms and braced by braces 146. In particular, the vanes 146 should be disposed at a suitable pitch angle to form a proper propeller for the conditions that are expected within the borehole. In addition, the outer surface of the vanes should be made circular so that the propeller can rotate in the borehole with the outer ends of the vanes in close proximity to the wall of the borehole.

From the above description it can be appreciated that there has been provided a logging tool which has a housing formed of two separate sections. In particular, the upper section is formed of a plurality of tubular members which are threaded together to form a unitary housing. The lower section of the tool is formed by a bristle support bar 110 and connected to the upper section by the strain gauge proving ring 151. The force tending to produce axial movement between the two sections is sensed by the strain gauge arrangement 150 described above. Thus, it is possible to measure the drag produced by the bristle brush network as the tool is moved through the borehole. This drag will be more sensitive to liquid flow rate as the tool is being inserted into the borehole with the bristles of the brush network being disposed in an upward position as described in '627. When the tool is withdrawn from the borehole and the bristles are pointed in a downward position as shown in the drawings 2I and 2J, drag force produced by the water flowing through will be substantially reduced. This permits one to obtain the total drag force by measuring the drag force produced by the bristles while lowering the tool into the borehole. The vapor flow is measured by means of the propeller 140 and motor/generator combination 131 following the method described in patent '926.

The discovery that the drag force produced by the bristles moving along the borehole wall could be utilized to determine the quantity of liquid in the two phase flow eliminates the need for other methods to measure the quantity of liquid by other means, as described in patent '926. It also eliminates more complicated means such as attempts to collect samples of the liquid and physically measure the quantity. This greatly simplifies the tool and requires only that the signal generated by the motor/generator combination be transmitted to the surface and does not require that the motor be energized to determine its speed-torque characteristics when liquid separated from the vapor is flowing over the propeller.

Figure 13:
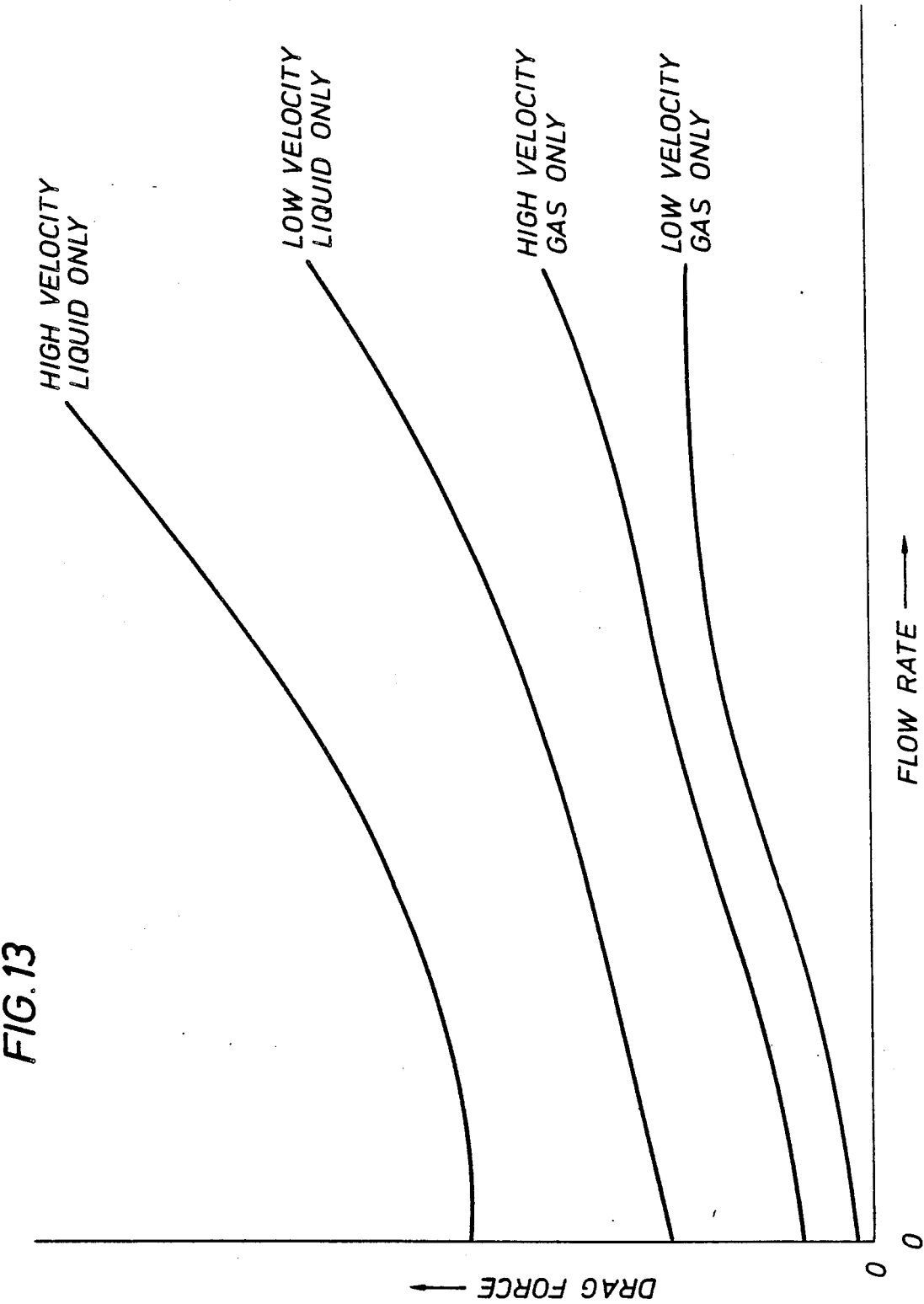

Referring to FIG. 13 there is shown a plot of drag forces produced by various flow rates of gas and water flowing in a conduit. While data shown is representative of the general relationship between drag forces and flow rate specific data can be obtained from laboratory measurements using the actual tool. The measurements can be obtained for various bristle configurations and with the bristles pointing up or down. Also, the drag force produced by liquid flowing alone, $(F_D)_L$, the gas flowing alone, $(F_D)_G$, and the total drag force under the effect of both flowing simultaneously, $F_D$, may be measured under various conditions. From these measurements one may compute the drag, $(F_D)_M$, due to the mixture of liquid and vapor from $$(F_D)_M = F_D - [(F_D)_G + (F_D)_L] \quad (1)$$

One can also develop the following correlations from the data:

$$(F_D)_G = (C_D)_G A_p \frac{\rho_G V_G^2}{2 g_c} \quad (2)$$

$$(F_D)_L = (C_D)_L A_p \frac{\rho_L V_L^2}{2 g_c} \quad (3)$$

$$(F_D)_M = (C_D)_m A_p \frac{\rho_m V_m^2}{2 g_c} \quad (4)$$

where $(C_D)_G$; $(C_D)_L$; $(C_D)_m$ are the drag coefficients for the gas, liquid and mixture.
$\rho_m = \lambda \rho_L + (1-\lambda)\rho_G$
$\lambda = (V)_L/[(V)_L + (V)_G] = (V)_L/(V_m)$
$A_p$ projected area of bristles
$V_m = [(V)_L + (V)_G]$
$V_L$ = superficial velocity of flow of liquid
$V_G$ = superficial velocity of flow of gas The flow rate of the vapor phase can be measured by the propeller motor/generator combination described above.

The test data can be analyzed to correlate the $C_d$'s with corresponding Reynolds numbers. A trial and error method using a computer to assign values and compute the results is then performed to find the value of $V_L$ that satisfies the measurements of drag force. The measurement of the drag force is made with the bristles pointed up. The best fit of the measured data is assumed when no further improvement is possible or when a 1 percent tolerance is achieved between the calculated and measured total drag force.

Using the values of $V_G$ and $V_L$ one can calculate the mass flow rate of the gas and liquid phases:

$$\omega_L = V_L \rho_L A_c$$

$$\omega_G = V_G \rho_G A_c$$

where $\omega$ = mass flow rate;
$\rho$ = density
$A_c$ = flow area of the casing.

The quality of the steam x can be determined from the mass flow rates of the gas and liquid phases.

$$x = \frac{\omega_G}{\omega_G + \omega_L}$$

From these measurements one can then calculate the actual thermal energy being supplied to any portion of the formation within the production zone. The data can be displayed as an injection profile of the well that will clearly illustrate any abnormalities in the well. For example, if the injection profile shows that the majority of the steam is being injected in a small section of the production zone, it would indicate that the steam had formed a flow path through the formation to a producing well. The well could be shut-in and steps taken to block the flow path and obtain a more uniform injection profile.

The tool is normally operated by measuring the liquid flow rate and steam quality above and below a set of perforations in the casing. The difference between the measurements provides the quantity and quality of steam injected into the formation through the perforations. By making measurements at each set of perforations an injection profile of the well will be obtained.

What is claimed is:

1. A method for determining both the quality and quantity of steam containing both vapor and liquid being injected into a hydrocarbon bearing formation in a thermal recovery process, said method comprising:

positioning a bladed rotating member attached to a motor/generator combination downhole adjacent the hydrocarbon formation;

measuring the voltage generated by the rotation of the rotating member;

positioning a network of bristles across the borehole to contact the wall of the borehole and intercept substantially all of the liquid flowing along the borehole wall;

measuring the total drag force due to liquid and vapor flow as said bristles are lowered into the borehole;

measuring the total drag force due to liquid and vapor flow as said bristles are withdrawn from the borehole;

determining the vapor flow rate by comparing the measured voltage with predetermined voltage versus vapor flow rate for the rotating member motor/generator combination; and determining the quantity of liquid flowing along the wall of the borehole by utilizing the measured drag forces and predetermined drag force versus vapor flow rate and liquid flow rate measurements.

2. The method of claim 1 wherein said drag forces are measured in the borehole and transmitted to the surface.

3. The method of claim 1 wherein said drag force is determined by measuring the tension on a member used to suspend the network of bristles in the borehole.

4. The method of claim 1 wherein the steam is injected into the formation through the perforations in a casing and the measurements are made at locations above and below the perforations.

5. An apparatus for measuring both the quality and quantity of steam containing both liquid and vapor being injected into a hydrocarbon formation penetrated by a borehole, said apparatus comprising:

an elongated housing adapted for lowering into and removal from the borehole, said housing being formed of at least two separate elongated sections disposed in an end-to-end relationship to form the elongated housing;

a resilient member, the opposite ends of said resilient member being operably connected to the adjacent ends of said separate sections of said housing to permit limited movement between said separate sections along the longitudinal axis of the housing;

a network of bristles, said bristles being mounted on the lowermost portion of said elongated sections when said housing is disposed in the borehole;

flow measuring means, said flow measuring means being mounted on the lower end of said lower section of said elongated housing to measure the vapor flow through the borehole; and strain measuring means, said strain measuring means being operably disposed to measure the tension between said separate sections as said elongated housing is moved through the borehole.

6. The apparatus of claim 5 and, in addition, a rigid member extending from the uppermost of said separate sections, the upper end of said resilient member being connected to said rigid member and the lower end of said resilient member being coupled to the lowermost of said separate sections, said strain measuring means being disposed to measure the strain in said rigid member.

7. The apparatus of claim 6 and, in addition, means disposed to limit the axial movement between said separate sections.

8. The apparatus of claim 7 wherein each end of said spring terminates in an enlarged end section, said enlarged end section including means for securing the end sections to the rigid member and the lowermost section of the housing.

9. The apparatus of claim 5 wherein said resilient member is a spring having a high spring rate and no rotational movement between the separate sections of the housing.

10. The apparatus of claim 9 wherein said spring comprises a flat metallic member having a narrow width in relation to its length and formed in a large number of uniform folds to provide a spring having compression/tension response and substantially no torsional response.

11. The apparatus of claim 5 and, in addition, tubing means disposed in said elongated housing to provide a purge gas flow path through at least a portion of the housing.

12. The apparatus of claim 11 and, in addition, flow control means disposed in one of said separate sections to control the discharge of said purge gas from said elongated housing.

13. The apparatus of claim 5 wherein said flow measuring means comprises a propeller motor/generator combination.

14. The apparatus of claim 13 and, in addition, flow means disposed in said housing for establishing purge gas flow through the housing to maintain a positive purge gas pressure in said motor/generator.

15. The apparatus of claim 5 and, in addition, centralizing means mounted on said housing for substantially centering the housing in the borehole.

16. The apparatus of claim 15 wherein at least two separate centralizing means are mounted on said housing, in spaced longitudinal positions.

17. The apparatus of claim 5 and, in addition, a cased well having a wellhead assembly, said wellhead assembly including a wellhead lubricator having an enlarged diameter section, said enlarged section being of sufficient diameter to permit inverting said bristles when said tool is positioned in the lubricator with the network of bristles located in said enlarged diameter section.

* * * * *